June 12, 1962

R. D. RUMSEY ETAL 3,038,561

ROTARY FLUTTER DAMPER

Filed Nov. 12, 1959

Inventors
Rollin Douglas Rumsey
John C. Schultz by Hill, Sherman, Meroni, Gross & Simpson Attys.

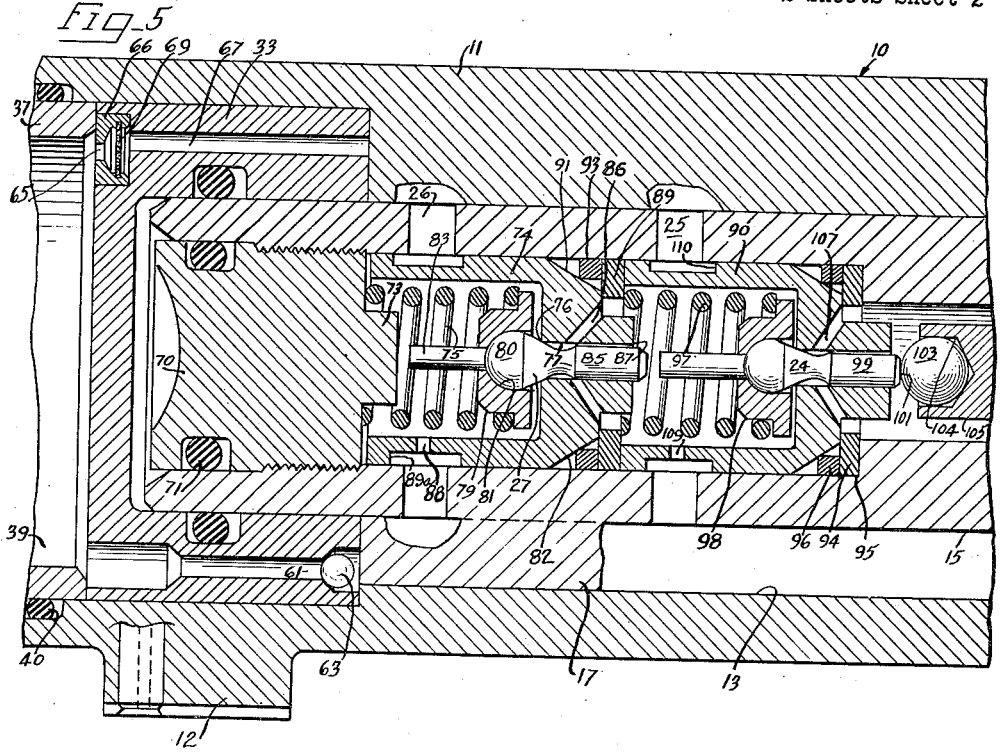
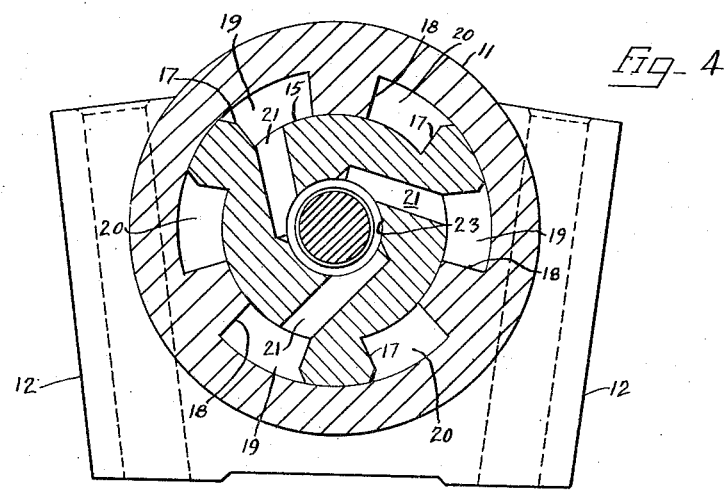

United States Patent Office
3,038,561
Patented June 12, 1962

3,038,561
ROTARY FLUTTER DAMPER
Rollin Douglas Rumsey and John C. Schultz, Buffalo, N.Y., assignors to Houdaille Industries, Inc., Buffalo, N.Y., a corporation of Michigan
Filed Nov. 12, 1959, Ser. No. 852,261
10 Claims. (Cl. 188—93)

This invention relates to improvements in dampers and more particularly relates to an improved damper for damping flutter of the adjustable air foil members of aircraft.

A principal object of the invention is to provide an improved form of flutter damper for damping the flutter of the air foil sections of aircraft so arranged as to provide a fast response to temperature changes in operation of the temperature compensator.

A further object of the invention is to provide a flutter damper of the rotary type having a temperature compensating element having zero change in size with temperature changes mounted within the wing shaft of the damper in which temperature compensation is attained by the differential in length between the wing shaft and temperature compensating element.

Still another object of the invention is to provide a flutter damper in which the flow area of the damping orifice is controlled by an Invar rod carried within the wing shaft of the damper, together with an improved connection between the Invar rod and the valve controlling the cross-sectional area of the damping orifice to give exact repeatable length in contact with the orifice control valve upon variations in temperature.

Still another object of the invention is to provide an improved form of rotary flutter damper utilizing a series of poppet relief valves operable under high pressure conditions, in which one of the poppet relief valves controls the cross-sectional area of the damping orifice and in which an Invar temperature compensating element has operative connection with the poppet relief valve to attain a substantially constant damping effect over a wide range of temperature variations.

Still another object of the invention is to provide an improved flutter damper having individual poppet relief valves operating for each stroke of the damper in which the poppet relief valves have contact with a generally conical seat, in which the loading surface on the valve is spherical to achieve accurate blow off pressure relief and in which the poppet relief valves are hydraulically stabilized to prevent chattering thereof.

These and other objects of the invention will appear from time to time as the following specification proceeds and with reference to the accompanying drawings wherein:

FIGURE 4 is a transverse sectional view taken substantially along line IV—IV of FIGURE 1; and FIGURE 5 is an enlarged fragmentary view showing the poppet relief valves and their seats in longitudinal section.

Figure 1:
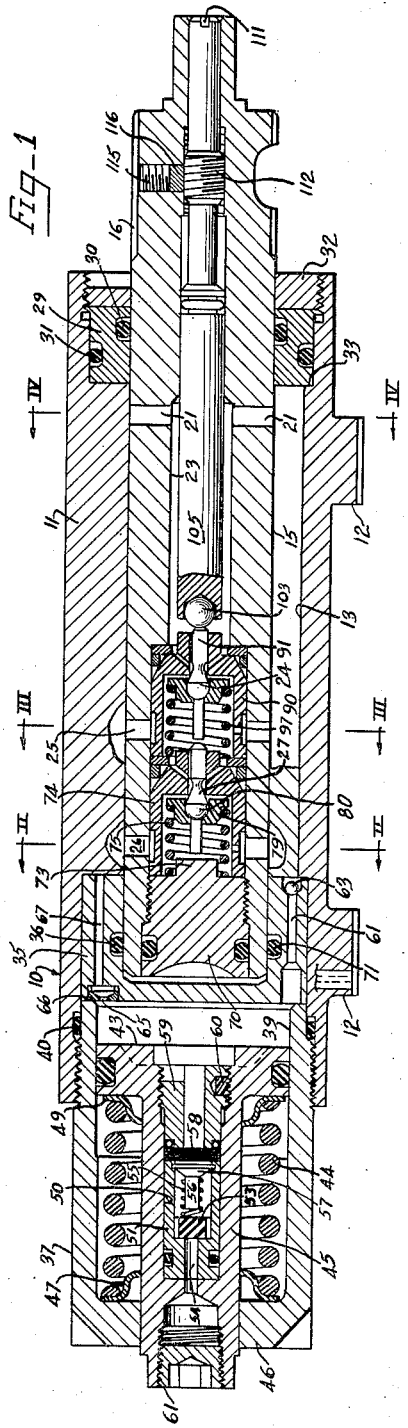
FIGURE 1 is a schematic longitudinal sectional view taken through a rotary damper structure constructed in accordance with the invention.

In the embodiment of the invention illustrated in the drawings, reference character 10 designates generally a flutter damper constructed in accordance with the principles of the invention and capable of being contained in freeworking relation within the joint portion of a movable control surface member of an airplane air foil assembly, such as an elevator, stabilizer or the like, to damp the tendency of the air foil assembly to flutter.

The flutter damper 10 is shown as being a rotary vane hydraulic piston type of damper comprising an elongated envelope or housing 11, which may be mounted coaxially with the hinge axis of a pivoted air foil member (not shown), and which may be attached thereto by means of attachment flanges 12, 12 extending laterally from the upper and lower sides thereof.

The housing or envelope 11 has an interior cylindrical wall portion 13 having a rotary piston 15 carried therein and projecting from one end thereof.

The housing 11 may be rigidly secured to the movable control member of the airplane for rocking movement about the axis of movement of the control member as the latter swings or tends to flutter, while a projecting end 16 of the piston 15 may be secured to a stationary part of the airplane.

Figure 3:
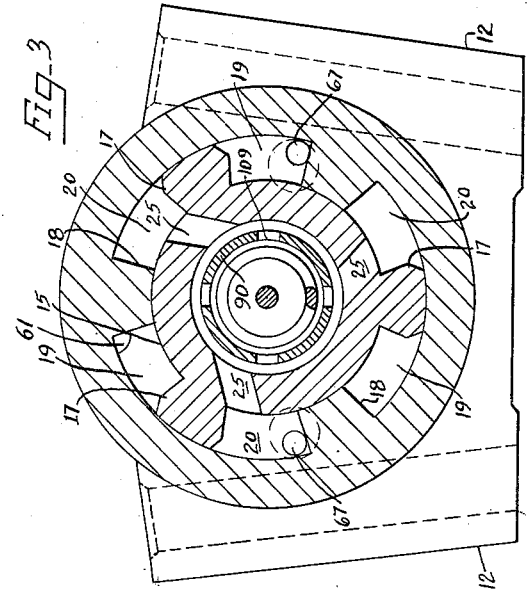
FIGURE 3 is a transverse sectional view taken substantially along line III—III of FIGURE 1.
Figure 2:
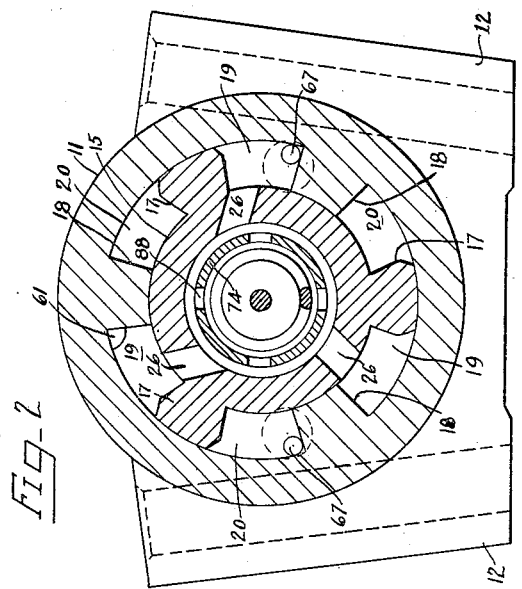
FIGURE 2 is a transverse sectional view taken substantially along line II—II of FIGURE 1.

The rotary piston 15, commonly called a wing shaft, is shown in FIGURES 2 and 3 as being provided with three laterally projecting vanes or wings 17, extending therealong for substantially the length of the cylindrical wall 13 and having slidable engagement therewith between reaction members or dividers 18. The reaction members or dividers 18 extend inwardly of the cylindrical wall 13 between the vanes 17 and cooperate with the wings or vanes 17 to divide the interior of the housing 11 into a plurality of opposed working chambers 19 and 20.

Hydraulic fluid under pressure is displaced from the working chambers 19 to the working chambers 20 through fluid displacement ports 21 leading to a hollow interior portion 23 of the rotary piston 15, through a poppet relief valve 24, which is cracked open to serve as a fluid displacement damping valve, and through fluid displacement ports 25 leading from the hollow interior portion 23 of the piston 15 to the working chambers 20. In the opposite direction of rotation of the damper, the reverse flow of hydraulic fluid will occur and fluid will be displaced through the fluid displacement ports 25 into the hollow interior 23 of the damping piston 15, past the poppet relief valve 24 and out through the fluid displacement ports 21 into the damping chambers 23, as will hereinafter more clearly appear as the specification proceeds. Fluid displacement ports 26 also lead from the hollow interior of the piston into the damping chambers 19 in spaced relation with respect to the fluid displacement ports 25 and cooperate with a poppet relief valve 27, to accommodate the flow of damping fluid from the damping chambers 20 to the damping chambers 19 upon excessive pressure conditions, which may be caused by low temperature conditions and relatively high viscosity of the damping fluid.

The end of the housing 11 adjacent the outwardly projecting end portion 16 of the wing shaft or rotary piston 15 has a bearing member 29 recessed therein, sealed to the wing shaft 15 by an O-ring seal 30 having sealing engagement with the wing shaft, and sealed to the interior of the housing 11 by an O-ring seal 31. A nut 32 is provided to lock the bearing member 29 in place against a shoulder 33.

The end of the rotary piston 15 opposite the projecting end portion 16 is rotatably mounted within the cylindrical wall portion of a cup-like plug 35 recessed within the housing 11 and press fitted therein. An O-ring seal 36, carried in the cylindrical wall portion of the plug 35 engages the periphery of the rotary piston or wing shaft 15, and forms a seal therefor.

Abutting the outer end of the plug 35 and threaded within the open end portion of the housing 11 opening to said plug is a generally cylindrical closure member 37, the interior of which forms a fluid replenishing chamber 39. The cylindrical closure member 37 is sealed to the inner wall of the housing 11 by an O-ring seal 40. The fluid replenishing chamber 39 is shown as having a piston 43 therein, biased toward the inner end of said fluid replenishing chamber by a compression spring 44 encircling a hollow piston rod 45 projecting outwardly from said piston and slidably guided in an outer end wall 46 of the cylindrical closure member 37. The compression spring 44 is seated at one end on a seating member 47 abutting the inner side of end wall 46 and is seated at its opposite end on a seating member 49 abutting the replenishing piston 43 to force said piston toward the plug 35 against hydraulic damping fluid within the fluid replenishing chamber 39.

The hollow interior portion of the piston rod 45 forms a check valve chamber 50 and has a generally cylindrical valve body 51 mounted therein, having a check valve 53 in association with a fluid inlet 54 into the hollow interior portion of the valve body 51. A spring 55 encircling a stem 56 of a spider 57 is provided to bias the check valve 53 in position to accommodate the flow of fluid under pressure into the fluid replenishing chamber 39, and to block the back flow of fluid from said fluid replenishing chamber.

A screen 58 abuts the inner end of the check valve body 51 and is retained in position by a passageway member or hollow plug 59 threaded within the piston 43 and hollow piston rod 45 and suitably locked thereto as by a Nylon locking plug 60.

A closure plug 61 is threaded in the outer end portion of the piston rod 45 and is removable to accommodate a fitting on the end of a pressure line (not shown) to be threaded therein, to fill the replenishing chamber 39 with hydraulic fluid under pressure, the hydraulic fluid moving the piston 43 outwardly along the fluid replenishing chamber against the spring 44 during filling thereof. The spring 44 biases the piston 43 inwardly along the chamber 39 and provides the pressure to replenish hydraulic fluid in the damping chamber through a fluid replenishing passageway 61 leading axially through the plug 35. A ball type check valve 63 is provided at the inner end of the passageway 61 to prevent the back flow of hydraulic fluid from the damping chamber to the fluid replenishing chamber 39.

The check valve 63 is retained in position by an abutment 18, shown in FIGURES 2 and 3 as extending partially over the inner open end portion of the passageway 61.

In order to bleed the damping chamber free from air, spaced air vents 65 lead through the bottom of filter retainers 66, seated in the outer end of the plug 35, and spaced at opposite sides of said plug. The air vents 65 are in axial alignment with passageways 67 leading axially through the wall of the plug 35 and are spaced at opposite sides of said plug, to enable the damper to be used on either a right or a left hand wing, and to provide automatic air bleed for the damper when mounted in either wing of the aircraft. The damper is, therefore, operative with either side up and when mounted in the wing of the aircraft, one or the other air bleed vents 65 will be located at the highest point of the working chamber of the damper.

It is understood that during operation of the damper, that a minute amount of damping fluid will be continuously pumped through the air vent and to the replenishing chamber 39 and that a slight amount of fluid will be returned to the damping chambers through the replenishing check valve 63. The air bleed vents 65 are approximately .003 inch in diameter in order to prevent loss of strength of the damper. The entering ends of the air bleed vents 65 are covered by filter screens 69 mounted in the retainers 66 at the entering ends thereof to filter foreign matter from the hydraulic fluid and to prevent clogging of said air vents.

Referring now to the relief valves 24 and 27, the inner end of the rotary piston 15 is closed by a plug 70 threaded within the inner end of said rotary piston and sealed thereto as by an O-ring seal 71. The plug 70 has a lug 73 projecting inwardly therefrom within a relief valve retainer or cage 74 and forming a retainer for a spring 75 biasing the relief valve 27 into engagement with a seat 76 defining the outer margin of a passageway 77 leading through an inner end wall 82 of the retainer 74.

The spring 75 is seated at its end opposite the plug 70 on a valve guide and spring seat 79 mounted on a semi-spherical outer end portion 80 of the relief valve 27.

As shown in FIGURES 1 and 5, the spring seat and valve guide 79 has a generally spherical socket 81 cooperating with the spherical head of the valve 27 to avoid angular displacement pressures on the valve 27 and to thereby increase the accuracy of operation of the valve and attain accurate blow-off pressure relief. A stop pin 83 projects from the spherical head 80 through the spring seat and valve guide 79 toward the lug 73 to limit movement of the valve 27 against the spring 75. Play is provided between the stop pin 83 and spring seat and valve guide 79, to accommodate freedom of movement and self-alignment of the spring seat and valve guide 79 on the spherical head 80.

The poppet relief valve 27 has a stem 85 projecting inwardly therefrom having slidable guiding engagement within the end wall 82 of the valve retainer 74 inwardly of angular flow passageways 86 leading angularly inwardly through the end wall 82 to the central passageway 77. The stem 85 has a flat portion 87 thereon and is generally D-shaped in cross-section, to produce a certain amount of hydraulic side load and induce damping friction on the poppet valve 27.

The retainer 74 has a cross-drilled passageway 88 leading to the interior thereof from an annular groove 89 opening to the outside of said retainer in fluid communication with the fluid displacement ports 26. The passageway 88 acts as a downstream control orifice and stabilizes the action of the poppet in such a manner that as the poppet opens in increasingly larger amounts the pressure drop shifts from across the poppet to across the orifice 88, and thereby damps any instability tendencies of the poppet 27.

The valve retainer 74 abuts a washer 89 at its inner end, which in turn abuts the annular wall of a valve retainer 90 for the poppet relief valve 24. The valve retainer 74 also has an inclined or frusto-conical inner face 91 abutting a seal 93 in abutting engagement with the washer 89. The seal 93 may be made from soft copper, which may be compressed into engagement with the bore of the rotary piston 15, to form leak-proof seals between the retainers 74 and 90, and avoid the possibility of hydraulic backlash in the unit.

The retainer 90 is like the retainer 74 and is interchangeable therewith and abuts a washer 94 and presses said washer into engagement with a shouldered portion 95 of the bore of the rotary piston and is sealed by an annular seal 96 abutting the washer 94 and maintained in abutting engagement with said washer and with the bore of the rotary piston by the retainer 90, pressed into engagement therewith.

The valve 24, a biasing spring 97 for said valve and a seating and valve guide member 98 for the spring 97, are like the valve 27, biasing spring 75 and seating and guide member 79, so the description thereof need not herein be repeated. The valve 24 has a stem 99 projecting therefrom, generally D-shaped in cross-section to produce a certain amount of side load on said valve stem and induce damping friction on the poppet valve 24. The valve stem 99 has a true flat end face 101 having bearing engagement with a ball 103 carried within a socket 104 on the inner end of a temperature compensating element, which is herein shown as being a rod 105 having zero change in length with temperature, and mounted within the hollow interior portion 23 of the rotary piston 15. The rod 105 may be an Invar rod, while the rotary piston may be made from a metal expanding at a faster rate than the Invar rod, resulting in a differential in length between the Invar rod 105 and the rotary piston 15, to move the poppet valve 24 with respect to its seat with substantially no lag upon changes in temperature.

The valve 24 is normally cracked open by the temperature compensating element 105 and uniform contact is made with the valve stem 99 at all times during operation of the damper by the ball 103 giving exact repeatable length throughout the entire temperature range to which the damper is subjected. The angle of the face of the valve 24, where it contacts its seat, as well as the diameter of the valve face, have been selected to match the thermal characteristics required of the damper, and to maintain a relatively constant damping torque of the damper throughout the entire temperature range to which the damper is subjected. Angular ports 107 lead radially and angularly inwardly of the retainer 90 from the inner end thereof, as in the retainer 74 and afford communication of damping fluid with the hollow interior of the retainer 90 through the orifice defined by cracking of the valve 24, accommodating said valve to form a damping orifice control valve during normal operation of the damper as well as a relief valve during excessive pressure conditions to which the damper may be subjected. A cross-drilled passageway 109 leads through the retainer 90 into an annular groove 110 in said retainer, opening to the fluid displacement ports 25. The passageway 109, like the passageway 89 serves to damp any instability tendencies of the poppet valve 24.

The temperature compensating rod 105 extends from the valve stem 99 along the chamber 23 to the outer end portion of the rotary piston 15 and has a slotted outer end portion 111 for accommodating a screwdriver and the like to change the position of adjustment of the poppet valve 24 and the area of the orifice formed between said poppet valve and its seat, to enable the damper to be calibrated for the particular damping operations that it is designed to carry out. The temperature compensating rod 105 has an intermediate threaded land 112 having threaded engagement with the interior of the rotary piston 15 to effect axial adjustment of said temperature compensating rod upon turning thereof.

In order to lock the temperature compensating rod 105 in position within the rotary piston 15, the set screw 115 is threaded within the outer end portion 16 of the rotary piston 15 radially of the temperature compensating rod 105. The set screw 115 abuts a copper disk 116, which is forced into engagement with the threads of the temperature compensating rod 105 by said set screw, and positively locks the temperature compensating rod 105 from axial shifting by forcing the threaded portion of said rod into intimate contact with the mating threads within the hollow interior portion of the rotary piston 15. The set screw 115 and copper disk 116 thus lock the temperature compensating rod 105 with sufficient rigidity that its position is repeatable over a wide range of cyclic temperature variations.

During normal operation of the damper at low levels of torque, wherein the relief valves 27 and 24 remain closed, fluid will enter the hollow interior portion 23 of the rotary piston 15 through the fluid displacement ports 21 and will flow through the ports 107, past the valve face of the poppet relief valve 24 and through the cross-drilled passageways 109 in the retainer 90 and out the fluid displacement passageways 25 into the damping chambers 20. In the opposite direction of rotation of the damper, fluid will flow from the damping chambers 20 through the fluid displacement ports 25 into the hollow interior portion of the valve retainer 90, past the face of the cracked valve 24 out through the ports or passageways 107 and into the damping chambers 19 through the fluid displacement ports 21.

At high damping torques when high damping pressures are developed, fluid will flow from the damping chambers 19 through the fluid displacement ports 21 into the hollow interior portion of the wing shaft 15 and through the ports or passageways 107 and lift the poppet relief valve 24 off its seat, to relieve excessive pressures and then flow out through the fluid displacement ports 25 into the damping chambers 20. Upon reversal of the direction of rotation of the damper, fluid will flow from the damping chambers 20 through the fluid displacement ports 25 and cross-drilled passageways 109 to the hollow interior of the retainer 90. Fluid will then flow through the passageways 86 to the passageway 77 through the inner end portion 82 of the retainer 74 and lift the poppet relief valve 27 off its seat when the pressure becomes great enough to overcome the spring 75. Damping fluid will then flow through the cross-drilled passageways 88 and through the fluid displacement ports 26 into the damping chambers 19.

It may be seen from the foregoing that an improved form of temperature compensating damper has been attained in which the temperature compensating element is a non-expansible Invar rod carried within the damping piston, made from a materal expanding at a relatively high rate, and that the damping piston is maintained in intimate contact with the damping fluid at all times, and thereby reduces the lag in the operation of the temperature compensating element to substantially zero.

It may also be seen that the damping orifice control valve is a poppet valve, maintained cracked by the temperature compensating element, and that the compensating element is rigidly maintained in position in the piston and the valve face is so contoured and the valve is so connected to the temperature compensating element as to repeat its position for each temperature change after a series of cyclic temperature variations, and to maintain a relatively constant damping torque throughout the entire temperature range to which the damper may be subjected.

Moreover, the orifice control valve is self-cleaning, due to the fact that the flow through the damping orifice is in two directions in which there will be a tendency to wash dirt tending to accumulate on the orifice in one direction of flow, as the flow of damping fluid is reversed, and where dirt may accumulate in sufficient quantity to restrict the flow and result in a higher pressure drop, the poppet valve will open up as a blow-off valve and any particles of dirt that may accumulate will be flushed from the valve seat.

It may further be seen that damping and pressure relief under high torque conditions is attained by two aligned poppet valves within the hollow interior of the rotary piston, one cracked open by a temperature compensating element and serving as an orifice control valve as well as a relief valve and opening to relieve the damper from excessive pressure conditions upon one direction of rotation of the damper, and the other relief valve opening upon the reverse direction of rotation of the damper to relieve the damper from excessive pressure conditions.

It may still further be seen that the poppet valves are so constructed as to provide stable operation throughout the entire pressure range to which the damper is subjected, and that the accuracy of operation of the poppet valves is improved by the spherical contacting surfaces between the spring seats and the valves, as well as the hydraulic side load on the stems of the valves, inducing damping friction on the poppet valves, together with the hydraulic stabilization of the poppet valves.

While we have herein shown and described one form in which our invention may be embodied, it should be understood that various modifications and variations in the invention may be effected without departing from the spirit and scope of the novel concepts of the invention as defined by the claims appended hereto.

We claim as our invention:

1. In a mechanical flutter damper, an elongated housing having an inner cylindrical wall normally filled with hydraulic fluid, a hollow rotary piston within said inner wall and having at least one sliding vane engageable with said inner wall, at least one abutment extending inwardly of said inner wall and cooperating with said sliding vane to form a plurality of working chambers, fluid displacement ports spaced axially along said piston and leading from the hollow interior portion thereof to said working chambers and accommodating the displacement of damping fluid from one working chamber to the other, and valve means controlling the flow of damping fluid between said working chambers in each direction of rotation of the damper, comprising a valve retainer within said piston having an inner end wall extending transversely of said piston having a passageway leading axially therethrough the inner margin of which defines a valve seat, a poppet valve extending through said passageway and having a frusto-conical face having engagement with said seat, a spring biasing said poppet valve into engagement with said seat, a temperature compensating element within the hollow interior of said piston and secured thereto for cracking said poppet valve with respect to said seat to define a damping orifice, and a ball on the inner end of said temperature compensating element having bearing engagement with said poppet valve and maintaining uniform contact between said temperature compensating element and said poppet valve, and giving substantially exact repeatable length over a series of cyclic temperature changes.

2. A mechanical flutter damper in accordance with claim 1, wherein the temperature compensating element comprises an Invar rod extending along the hollow interior portion of said rotary piston and rigidly maintained in position within said rotary piston.

3. In a damper for damping flutter and the like, a housing having an inner cylindrical wall normally filled with hydraulic fluid, a hollow rotary piston within said housing having at least one sliding vane engageable with said inner wall, at least one abutment extending inwardly of said inner wall and cooperating with said vane to form a plurality of varying volume working chambers, axially spaced fluid displacement ports affording communication between the hollow interior of said piston and said working chambers, valve means controlling the flow of damping fluid from the working chamber of decreasing volume to that of increasing volume in each direction of rotation of the damper, comprising a valve retainer within the hollow interior of said piston and having an end wall extending transversely of said piston having an axial passageway and a valve guide leading therethrough, the margin of said passageway at the inner side of said wall defining a valve seat, passageway means leading into said axial passageway intermediate the ends thereof and affording fluid communication from one side of said wall to the other, a poppet valve having a frusto-conical valve face cooperating with said seat, spring means biasing said valve into engagement with said seat, and temperature compensating means extending along the hollow interior of said piston and secured thereto at one end and having operative connection with said poppet valve at its opposite end for cracking said valve with respect to said seat.

4. A damper in accordance with claim 3, wherein said poppet valve has a stem extending along said passageway and guide, and wherein said stem has a flattened portion within said guide, providing a space between said passageway and guide effecting a hydraulic side load on said valve and inducing damping friction thereon.

5. In a rotary damper for damping flutter and the like, a housing having an inner cylindrical wall defining a damping chamber normally filled with hydraulic fluid, a hollow rotary piston within said damping chamber having at least one sliding vane having slidable engagement with said cylindrical wall, at least one abutment extending inwardly of said cylindrical wall and cooperating with said vane to define a plurality of working chambers of varying volume, a valve retainer within the hollow interior of said piston having an end wall extending transversely thereof, an axial passageway and valve guide leading through said end wall, the margin of said passageway at one side of said end wall defining a valve seat, angular and radially extending passageways leading through said end wall to said passageway intermediate the ends thereof for conducting damping fluid past said valve seat, a poppet valve seating against said seat and having a generally conical valve face and having a stem extending therefrom, guided in said axial passageway and valve guide, said poppet valve having a generally spherical head portion having a spring retainer mounted thereon, a spring seated on said spring retainer and biasing said poppet valve into a closed position, fluid displacement ports leading from the hollow interior of said piston and spaced on opposite sides of said valve seat and affording communication between said working chambers through said poppet valve and seat, a temperature compensating element rigidly secured to said piston and extending along the hollow interior thereof and a spherical bearing engaging connection between said temperature compensating element and said valve stem maintaining said poppet valve cracked during normal operation of the damper.

6. A damper in accordance with claim 5, wherein the temperature compensating element is an Invar rod and wherein the damping piston is made from steel.

7. A rotary damper in accordance with claim 6, wherein the valve stem has a flat face affording communication of fluid through said axial passageway and valve guide and producing hydraulic side load on said valve, inducing damping friction thereon.

8. In a damper for damping flutter and the like, a housing having an inner cylindrical wall normally filled with hydraulic fluid, a hollow rotary piston within said housing having at least one sliding vane engageable with said inner wall, at least one abutment extending inwardly of said inner wall and cooperating with said vane to form at least two varying volume working chambers, axially spaced fluid displacement ports affording communication between the hollow interior of said piston and said working chambers, valve means controlling the flow of damping fluid from a working chamber of decreasing volume to a working chamber of increasing volume in each direction of rotation of the damper, comprising a valve retainer within the hollow interior of said piston and having an end wall extending transversely of said piston having an axial passageway and valve guide leading therethrough, the inner margin of said passageway at the inner side of said wall defining a valve seat, passageway means leading into said axial passageway intermediate the ends thereof and affording fluid communication from one side of said wall to the other, a poppet valve having a frusto-conical valve face cooperating with said seat, spring means biasing said valve into engagement with said seat, said hollow piston being made from steel, and temperature compensating means comprising an Invar rod extending along the hollow interior of said piston and rigidly secured thereto and having bearing engagement with said valve.

9. In a mechanical flutter damper, an elongated housing having an inner cylindrical wall normally filled with hydraulic fluid, a hollow rotary piston within said housing having at least one sliding vane engageable with said inner wall, at least one abutment extending inwardly of said inner wall and cooperating with said vane to form a plurality of working chambers, axially spaced fluid displacement ports affording communication between the hollow interior of said piston and said working chambers, valve means controlling the flow of damping fluid from a working chamber of decreasing volume to a working chamber of increasing volume in each direction of rotation of the damper, comprising a valve retainer within the hollow interior of said piston and having an end wall extending transversely of said piston having an axial passageway and valve guide leading therethrough, the margin of said passageway at the inner side of said wall defining a valve seat, passageway means leading into said axial passageway intermediate the ends thereof and affording fluid communication from one side of said wall to the other, a poppet valve having a frusto-conical valve face cooperating with said seat, spring means biasing said valve into engagement with said seat, said hollow piston being made from steel, an Invar temperature compensating rod having a threaded portion threaded within said piston, an operative connection between said Invar rod and said poppet valve for adjusting the position of said poppet valve by turning movement of said Invar rod, and a positive lock between said Invar rod and said piston, locking said rod from axial movement with respect to said piston, and holding said rod rigid with respect thereto comprising a copper disk engageable with the threaded portion of said rod, and a set screw maintaining said disk in engagement with the threaded portion of said rod.

10. In a damper for damping flutter and the like, an elongated housing normally filled with hydraulic fluid and having an inner cylindrical wall, a hollow rotary piston made from steel within said housing and having at least one sliding vane slidably engaging said cylindrical wall, at least one abutment extending inwardly of said cylindrical wall and cooperating with said sliding vane to define a plurality of working chambers of varying volume, two aligned poppet relief valves within the hollow interior of said piston, fluid displacement ports leading from the hollow interior of said piston on opposite sides of said poppet relief valves to one working chamber, fluid displacement ports leading from the hollow interior of said piston between said poppet relief valves to the other working chamber, an Invar rod extending along the hollow interior portion of said piston and rigidly secured to said piston at one end and having a spherical head at its opposite end engageable with an adjacent of said poppet relief valves to maintain said poppet relief valve cracked a uniform amount and to compensate for temperature variations to which the damper is subjected.

References Cited in the file of this patent
UNITED STATES PATENTS

| | | |
|---|---|---|
| Re. 20,882 | Wise | Oct. 11, 1938 |
| 1,778,905 | Mitchell | Oct. 21, 1930 |
| 1,881,450 | Fox | Oct. 11, 1932 |
| 2,009,676 | Pennington | July 30, 1935 |
| 2,009,677 | Pennington | July 30, 1935 |
| 2,043,465 | Clifford | June 9, 1936 |
| 2,060,554 | Chryst | Nov. 10, 1936 |
| 2,516,781 | Magrum et al. | July 25, 1950 |
| 2,516,782 | Magrum | July 25, 1950 |
| 2,814,362 | Sweeney | Nov. 26, 1957 |